(12) United States Patent
Kondo et al.

(10) Patent No.: US 10,232,560 B2
(45) Date of Patent: Mar. 19, 2019

(54) COMPOSITE STRUCTURE FORMED OF FIBER REINFORCED PLASTIC SHEET AND METALLIC SHEET, AND MANUFACTURING METHOD THEREOF

(71) Applicant: AISIN TAKAOKA CO., LTD., Toyota-shi, Aichi (JP)

(72) Inventors: Kiyohito Kondo, Toyota (JP); Yuji Yamashita, Toyota (JP)

(73) Assignee: AISIN TAKAOKA CO., LTD., Toyota-Shi, Aichi (JP)

( * ) Notice: Subject to any disclaimer, the term of this patent is extended or adjusted under 35 U.S.C. 154(b) by 512 days.

(21) Appl. No.: 14/776,005

(22) PCT Filed: Mar. 12, 2014

(86) PCT No.: PCT/JP2014/056542
§ 371 (c)(1),
(2) Date: Sep. 14, 2015

(87) PCT Pub. No.: WO2014/142189
PCT Pub. Date: Sep. 18, 2014

(65) Prior Publication Data
US 2016/0016359 A1   Jan. 21, 2016

(30) Foreign Application Priority Data

Mar. 13, 2013 (JP) ................. 2013-050924

(51) Int. Cl.
*B29C 70/68* (2006.01)
*B29C 65/60* (2006.01)
(Continued)

(52) U.S. Cl.
CPC ........ *B29C 65/603* (2013.01); *B29C 37/0085* (2013.01); *B29C 43/18* (2013.01);
(Continued)

(58) Field of Classification Search
None
See application file for complete search history.

(56) References Cited

U.S. PATENT DOCUMENTS 4,274,901 A * 6/1981 Elber ................... B29C 70/086
156/242
5,361,483 A   11/1994 Rainville et al.
(Continued)

FOREIGN PATENT DOCUMENTS

CN      2753801 Y    1/2006
CN    101446354 A    6/2009
(Continued)

OTHER PUBLICATIONS

The extended European Search Report dated Nov. 7, 2016, by the European Patent Office in corresponding European Patent Application No. 14764186.4-1706. (11 pgs).
(Continued)

*Primary Examiner* — Matthew J Daniels
*Assistant Examiner* — Mohammad M Ameen
(74) *Attorney, Agent, or Firm* — Buchanan Ingersoll & Rooney PC

(57) ABSTRACT

A manufacturing method of a composite structure includes: (a) preparing: a metallic sheet(s) having a through-hole(s) penetrating throughout the metallic sheet(s) in its thickness direction; (b) setting a prepreg(s), constituting a fiber reinforced plastic sheet(s), and the metallic sheet in a pair of dies, which have a recess(es) arranged at a position(s) opposed to one side opening(s) of the through-hole(s), the recess(es) having a larger diameter than the one side opening; (c) closing the dies, wherein, upon closing, (ca) the prepreg(s) and the metallic sheet are molded to the predetermined shape, while surface-contacting therebetween, (cb) at least one of the prepreg(s) and a patch member(s) is extruded into the through-hole(s), so that the shaft part is (Continued)

molded, and (cc) the patch member(s) forms at least part of a head part(s) in the recess(es), the head part(s) integrated with the shaft part(s) and engaging on the metallic sheet(s).

10 Claims, 10 Drawing Sheets

(51) Int. Cl.
| | |
|---|---|
| *B29C 43/18* | (2006.01) |
| *B29C 70/74* | (2006.01) |
| *B29C 70/86* | (2006.01) |
| *B29C 70/46* | (2006.01) |
| *B32B 3/26* | (2006.01) |
| *B32B 3/30* | (2006.01) |
| *B32B 15/08* | (2006.01) |
| *B29C 37/00* | (2006.01) |
| *B29L 31/00* | (2006.01) |
| *B29C 65/00* | (2006.01) |
| *B29K 105/08* | (2006.01) |
| *B29K 307/04* | (2006.01) |
| *B29K 705/00* | (2006.01) |

(52) U.S. Cl.
CPC ............ *B29C 70/465* (2013.01); *B29C 70/68* (2013.01); *B29C 70/682* (2013.01); *B29C 70/745* (2013.01); *B29C 70/86* (2013.01); *B32B 3/266* (2013.01); *B32B 3/30* (2013.01); *B32B 15/08* (2013.01); *B29C 65/606* (2013.01); *B29C 66/21* (2013.01); *B29C 66/304* (2013.01); *B29C 66/545* (2013.01); *B29C 66/721* (2013.01); *B29C 66/742* (2013.01); *B29C 66/8322* (2013.01); *B29C 66/843* (2013.01); *B29K 2105/0872* (2013.01); *B29K 2307/04* (2013.01); *B29K 2705/00* (2013.01); *B29L 2031/737* (2013.01)

(56) References Cited

U.S. PATENT DOCUMENTS

| | | | |
|---|---|---|---|
| 5,717,191 A * | 2/1998 | Christensen | B29C 66/721 |
| | | | 219/603 |
| 6,468,613 B1 | 10/2002 | Kitano et al. | |
| 7,802,799 B1 | 9/2010 | Semmes | |
| 8,636,936 B2 * | 1/2014 | Modin | B29C 70/545 |
| | | | 264/273 |
| 9,409,354 B2 | 8/2016 | Albers et al. | |
| 2005/0048260 A1 | 3/2005 | Modin et al. | |
| 2006/0108059 A1 | 5/2006 | Modin et al. | |
| 2007/0181306 A1* | 8/2007 | Tupper | C23C 18/1208 |
| | | | 166/302 |
| 2008/0003401 A1 | 1/2008 | Barnes et al. | |
| 2008/0131661 A1* | 6/2008 | Albers | B29C 43/18 |
| | | | 428/139 |
| 2010/0143650 A1 | 6/2010 | Tsai et al. | |
| 2011/0059290 A1 | 3/2011 | Gage et al. | |
| 2014/0141215 A1 | 5/2014 | Albers et al. | |

FOREIGN PATENT DOCUMENTS

| | | | | |
|---|---|---|---|---|
| CN | 201507721 U | 6/2010 | | |
| DE | 10 2005 061 280 B3 | 4/2007 | | |
| EP | 2292709 A2 | 3/2011 | | |
| GB | 2205374 A | 12/1988 | | |
| JP | 06-091021 | * | 4/1994 | |
| JP | 6-91021 A | 4/1994 | | |
| JP | 6-101732 A | 4/1994 | | |
| JP | 0691021 A | 4/1994 | | |
| JP | H06-91021 A | * | 4/1994 | ........... A63B 53/047 |
| JP | 2003-305775 A | 10/2003 | | |
| JP | 2007-001226 A | 1/2007 | | |
| JP | 2009-241569 A | 10/2009 | | |
| JP | 2011-042030 A | 3/2011 | | |
| JP | 2011-247386 A | 12/2011 | | |
| WO | WO 99/10168 A1 | 3/1999 | | |

OTHER PUBLICATIONS

Communication pursuant to Article 94(3) EPC dated Aug. 9, 2017, by the European Patent Office in corresponding European Patent Application No. 14 764 186.4-1706. (6 pages).

Office Action dated Aug. 3, 2016, by the State Intellectual Property Office of China in corresponding Chinese Patent Application No. 201480013796.2, and an English translation of the Office Action. (18 pages).

Office Action (Notice of Grounds for Rejection) dated May 17, 2016, by the Japanese Patent Office in corresponding Japanese Patent Application No. 2015-505524 and English translation of the Office Action. (5 pages).

International Search Report (PCT/ISA/210) dated Jun. 10, 2014, by the Japanese Patent Office as the International Searching Authority for International Application No. PCT/JP2014/056542.

Written Opinion (PCT/ISA/237) dated Jun. 10, 2014, by the Japanese Patent Office as the International Searching Authority for International Application No. PCT/JP2014/056542.

* cited by examiner

_US 10,232,560 B2_

COMPOSITE STRUCTURE FORMED OF FIBER REINFORCED PLASTIC SHEET AND METALLIC SHEET, AND MANUFACTURING METHOD THEREOF

TECHNICAL FIELD

Cross-Reference to Related Applications

The present application claims priority based on JP Patent Application No. 2013-050924, filed in Japan on Mar. 13, 2013, whose entire disclosure is incorporated herein by reference thereto.

The present disclosure relates to a composite structure formed of a fiber reinforced plastic sheet and a metallic material sheet, and a manufacturing method thereof.

BACKGROUND

Those kinds of composite structure and manufacturing method thereof are known, for example, as disclosed in JPH6-101732A and WO99/10168A.

PATENT LITERATURE

[PTL 1]
JPH6-101732A
[PTL 2]
WO99/10168A

SUMMARY

The following analysis is given by the present invention.

In those kind of the conventional manufacturing method as described hereinabove, a molding process for molding a fiber reinforced plastic member and a bonding process of bonding a fiber reinforced plastic member to a metallic sheet are separately performed. Therefore, that kind of the conventional manufacturing method still has room for improvement in terms of manufacturing cost etc. (i.e., manufacturing cost and bonding strength between the fiber reinforced plastic member and the metallic sheet). The present invention is made in view of the circumstance etc. as exemplified hereinabove.

To achieve the hereinabove object, in a first aspect, there is provided a manufacturing method of a composite structure formed of a fiber reinforced plastic sheet and a metallic material sheet, the method comprising the processes as follows:
(1) preparing a pair of dies for molding a composite structure of a predetermined shape;
(2) preparing a metallic sheet(s) having at least one opening defined by a through-hole(s) penetrating the metallic sheet(s) in a thickness direction of the metallic sheet(s);
(3) setting a patch member(s) on one of the pair of dies, the patch member(s) made of plastic and having a larger size than the opening(s);
(4) setting a prepreg(s) to constitute a fiber reinforced plastic sheet(s) and the metallic sheet(s) in the pair of dies in a manner that the metallic sheet(s) is interposed between the prepreg(s) and the patch member(s); and
(5) closing the pair of dies to joint-bond the prepreg(s), the metallic sheet, and the patch member(s) each other, thereby producing a composite structure molded in the predetermined shape. At this time, a pressure member(s) provided on the other dies of the pair of dies, selectively applies jointing pressure(s) on a corresponding portion(s) located inwardly of the at least one opening so as to bond the prepreg(s) to the patch member(s) through the one opening(s).

In a second aspect, there is provided a manufacturing method of a composite structure formed of a fiber reinforced plastic sheet and a metallic material sheet, the method comprising the processes as follows:
(a) preparing: a metallic sheet(s) having a through-hole(s) penetrating the metallic sheet(s) in a thickness direction of the metallic sheet(s); a prepreg(s) in order to constitute a fiber reinforced plastic sheet(s); a pair of dies for molding a composite structure of a predetermined shape, wherein the pair of dies can have a recess(es) arranged on a position(s) opposed to one side opening(s) of the through-hole(s), the recess(es) having a larger diameter than the one side opening, and a patch member(s) to be set on a position(s) opposed to the through-hole(s);
(b) setting the prepreg(s) and the metallic sheet in the pair of dies;
(c) closing the pair of dies, wherein, upon the closing,
(ca) the prepreg(s) and the metallic sheet are molded into the predetermined shape, while surface-contacting therebetween,
(cb) at least one of the prepreg(s) and the patch member(s) is extruded into the through-hole(s), so that a shaft part is molded, and
(cc) the patch member(s) forms at least part of a head part(s) in the recess(es), the head part(s) being integrated with the shaft part(s) and engaging with (hooking on) the metallic sheet(s).

In a third aspect, there is provided a composite structure formed of a fiber reinforced plastic sheet and a metallic material sheet, the composite structure comprising the processes as follows:
a metallic sheet(s) having a through-hole(s) which is configurated to penetrate in a thickness direction of the metallic sheet and to be opened on one side surface and the other side surface of the metallic sheet(s);
a fiber reinforced plastic sheet(s) joint-bonded on the one side surface of the metallic sheet(s);
a plastic shaft part(s) disposed in the through-hole(s) and integrated with the fiber reinforced plastic sheet(s); and
a plastic head part(s) (or engaging/hooking part(s)) arranged on the other side surface and integrated with the plastic shaft part(s), the plastic head part(s) having a lager diameter(s) than the other side opening(s) of the through-hole(s) and engaged with (hooked on) the other side surface.

Advantageous effects of Invention are mentioned below without limitation. According to the first aspect, the molding the fiber reinforced plastic sheet in a shape corresponding to the predetermined shape, and the molding the composite structure in the predetermined shape using joint-bonding the molded product or the fiber reinforced plastic sheet to the metallic sheet are simultaneously performed upon closing the pair of dies. In detail, the joint-bonding the fiber reinforced plastic sheet (the prepreg) to the metallic sheet is achieved by bonding the fiber reinforced plastics sheet (the prepreg) to the patch member(s) through the opening(s) arranged on the metallic sheet. Therefore, it is possible to satisfactorily reduce manufacturing cost of the composite structure. Furthermore, the patch member(s) has a larger size than the opening(s). Accordingly, the composite structure can have satisfactorily joint-bonding strength.

In the first to third aspects, the fiber reinforced plastic sheet(s) (prepreg(s)) joint-bonding to one side surface of the metallic sheet, the shaft(s) formed in the through-hole(s) in the metallic sheet, and the head part engaging with (hooking on) the other surface side of the metallic sheet are integrally molded, thereby the fiber reinforced plastic sheet(s) is firmly bonded to the metallic sheet in a mechanical manner, and accordingly, the composite stricture has an improved impact resistance.

PREFERRED MODES

Figure 1:
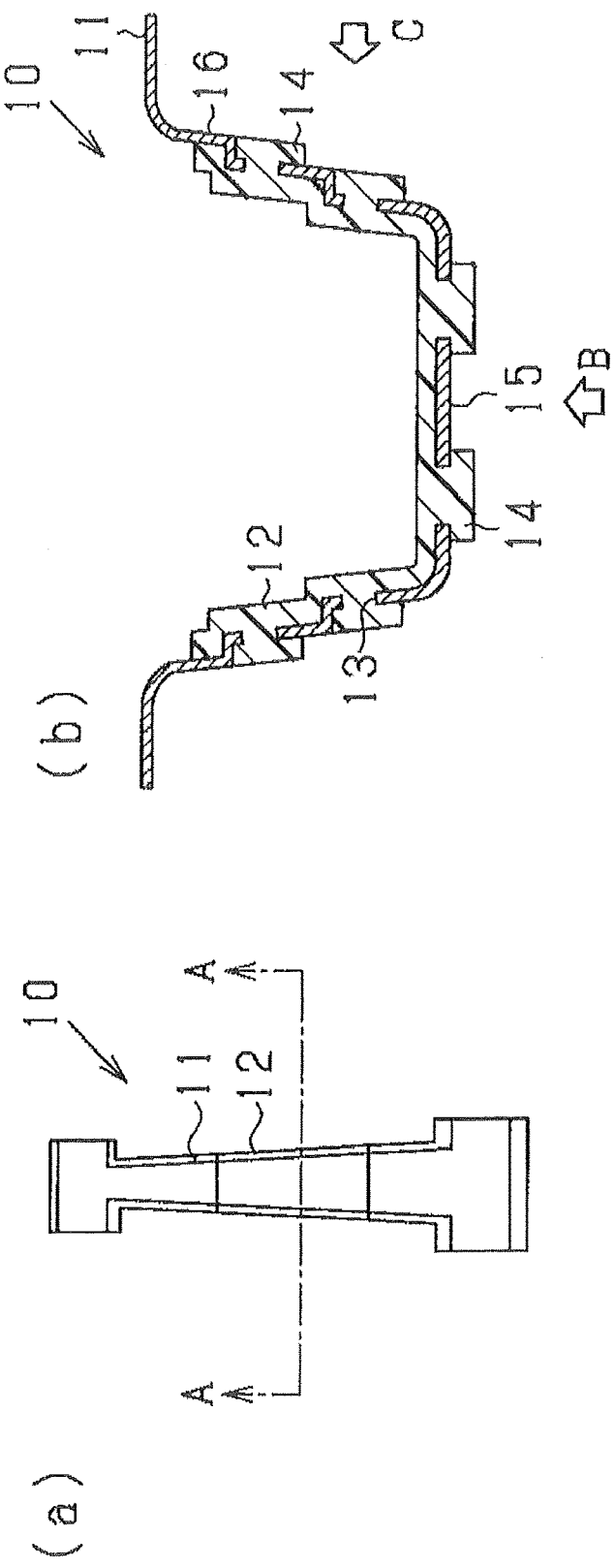
FIG. 1 is schematic plan and cross-sectional views illustrating an approximate configuration of a composite structure manufactured by a manufacturing method according to one example of the present disclosure.

MODE 1: See the first aspect as herein-above mentioned.

MODE 2: The one die of the pair of dies has a recess(es) receiving the patch member(s), and the recess(es) is opened in a removal direction of the composite structure after molding.

MODE 3: The pair of dies have a step difference profile(s) arranged on the inner surface extending in a relative movement direction of the pair of dies, and the recess(es) is defined by the step difference profile(s).

MODE 4: The fiber reinforced plastic sheet(s) is joint-bonded to one side surface(s) of the metallic sheet(s).

MODE 5: The fiber reinforced plastic sheet(s) contains continuous reinforce fiber.

MODE 6: As the prepreg(s), a prepreg(s) having a thickening part(s) arranged on a position(s) opposed on the through-hole(s) is prepared. The thickening part(s) is extruded into the through-hole(s) so as to bond to the patch member(s) set in the pair of dies.

MODE 7: The patch member(s) is set on the prepreg, instead of being set on the pair of dies.

MODE 8: a shaft part(s) is molded in the through-hole(s) so that the shaft part(s) is integrated with the prepreg, and a head or engaging (hook) part(s) is molded in the recess(es) so that the head or engaging (hook) part(s) is integrated with the shaft part(s) and has a larger diameter(s) than the opening(s).

In the Mode 2, the recess(es) receives the patch member(s). Therefore, setting the patch member(s) can be satisfactorily performed. In addition, the recess(es) is open toward a removal direction of the molded composite structure. For this reason, removal of the molded composite structure can be satisfactorily performed.

According to Mode 3, the patch member(s) is set on the inner surface, the inner surface extending along the relative movement direction of the pair of dies, and thereby, set of the patch member(s) and removal of the molded composite structure can be satisfactorily performed.

According to Mode 4, the fiber reinforced plastic sheet(s) is joint-bonded to the one side surface(s) of the metallic sheet(s), so that manufacturing cost and bonding strength, both can relating to the case of molding the composite structure in a shape, can be satisfactorily improved, compared with the conventional manufacturing method.

According to Mode 5, bonding the fiber reinforced plastic sheet(s) containing continuous reinforcement fibers (filaments) in the metallic sheet(s) can be satisfactorily performed at a lower cost and with a satisfactory boding strength.

According to Mode 6, the prepreg(s) has a thickening (thickened) part(s) serving as a second patch member.

According to Mode 7, the dies can be formed in a simple profile, since the patch member(s) is set on the prepreg(s).

According to Mode 8, mechanical joint (engagement) between the fiber reinforced plastic sheet and the metallic sheet is firm due to integration of the prepreg, the shaft part and the head part.

MODE 9: See the first aspect as herein-above mentioned.

MODE 10: In the above process (a), the patch member(s) is set in the recess(es), and then, in the above process (c), the prepreg(s) is extruded into the through-hole(s) to bond to the patch member(s) in the recess(es) by closing of the pair of dies or associated with the closing, and consequently, the shaft part(s) and the head(s) are formed.

MODE 11: In the above process (a), the patch member(s) is set on the prepreg(s), and then, in the above process (c), the patch member (s) is extruded into the through-hole(s) and further into the recess(es) by closing of the pair of dies or associated with the closing, and consequently, the shaft part(s) and the head(s) is molded.

MODE 12: In the above process (a), the first patch member(s) used as the patch member is set on the prepreg(s), and the second patch member(s) used as the patch member is set in the recess(es), and then, in the above process (c), the first patch member (s) is extruded into the through-hole(s) to bond to the second patch member(s) by closing of the pair of dies or associated with the closing, and consequently, the shaft part(s) and the head(s) are formed.

Referring to Modes 9 to 12, the patch member(s) is set in/on the die(s) or the prepreg(s), or both in/on the die(s) and the prepreg(s). In one case of setting the patch member(s) in the die(s), the recess(es) for receiving the patch member(s) may be provided between the dies, in particular, between the metallic sheet and one die of the dies. In the other case of setting the patch member(s) in/on the prepreg(s), the prepreg(s) may be locally provided with the thickened part(s), using a manner that the patch member(s) is attached on the prepreg(s); or a laminating number of the prepreg materials are locally increased. Such formed thickened part(s) serve as the parch member. The patch member(s) may be also set on the metallic sheet(s).

The selectively extruding the patch member(s) or the thick part(s) of the prepreg can be performed by closing of the pair of dies, and additionally, the mold may be provided with a plunger mechanism, or the mold contacting the prepreg may be provided with a step difference profile(s) and/or a convex(es).

The patch member(s) can be set on a place(s) facing the one side opening(s), the other side opening(s), or the both sides openings of the through-hole(s) formed in the metallic sheet(s).

Around the one side opening(s) or edge(s) of the through-hole(s) in the metallic sheet(s), a counterbore(s) may be formed. The counterbore(s) may be utilized for engaging (hooking) the patch member(s), and/or utilized as a fit part(s) onto which the plastic head part(s) fits.

The recess(es) formed by the pair of dies can be formed in the one die, in particular, the one die disposed on the metallic sheet side, and additionally may be formed utilizing the metallic sheet(s). The recess(es) can be formed utilizing both a step difference profile(s) formed on the one die and the other surface of the metallic sheet(s).

Chemical bonding between one side surface of the prepreg(s) (the fiber reinforced plastic sheet part(s)) and one side surface of the metallic sheet can be provided through applying pressure and/or heating, using a resin contained in the prepreg(s) and/or an adhesive separately applied.

The plastic shaft part(s) and the plastic head part(s) may contain fiber, as well as the prepreg(s).

It is noted that each of the modes can be mutually is applied to each of the aspects.

Hereinafter, one exemplary embodiment will be explained, referring to drawings. In addition, modifications and/or variations are indicated at the end of Description, since the understanding of the explanation of the consistent one exemplary embodiment would be disturbed when such modifications and/or variations are inserted in the explanation of the one exemplary embodiment.

<Constitution of Composite Structure>

FIG. 1(*a*) is a schematic plan view illustrating an approximate configuration of a composite structure manufactured by a manufacturing method according to one exemplary embodiment, and FIG. 1(*b*) is a schematic cross-sectional view taken along a line A-A in FIG. 1(*a*). In the present exemplary embodiment, a composite structure 10, which is used as a vehicle center pillar, is formed to be integrated to a main body made of a high-tension steel sheet as a metallic sheet with a reinforcing member 12 made of a fiber reinforced plastic (CFRP) sheet containing continuous carbon fiber (long filament) by bonding those elements. In the composite structure 10, for weight-lighting components, the composite structure 10 is only provided with the reinforcing member 12 on a longitudinal center section of the composite structure 10 (see FIG. 1(*a*)), and on one surface side of the main body 11, i.e., inner side of a hat-shape in the cross sectional view as shown in FIG. 1(*b*), since the center section needs high strength.

On a section where the reinforcing member 12 is bonded, i.e, the longitudinal center section of the main body 10, a plurality of openings 13 are formed, each of the openings 13 being defined by a through-hole having a round shaped section. The openings 13 are provided to penetrate throughout the main body 11 in a thickness direction. In addition, patch members 14 are provided so as to oppose the reinforcing member 12 via the openings 13, respectively. The patch members 14 are made of a short fiber reinforced plastic CFRP having a matrix resin which is same as a matrix resin used in the reinforcing member 12, and each of the patch members 14 is formed in a disk, having a larger outer-diameter than an inner-diameter of the opening 13. The reinforcing members 12 and the patch members 14 are firmly bonded each other, caused by fusion of two matrix resins contained therein on an inner side of the openings 13.

Figure 2:
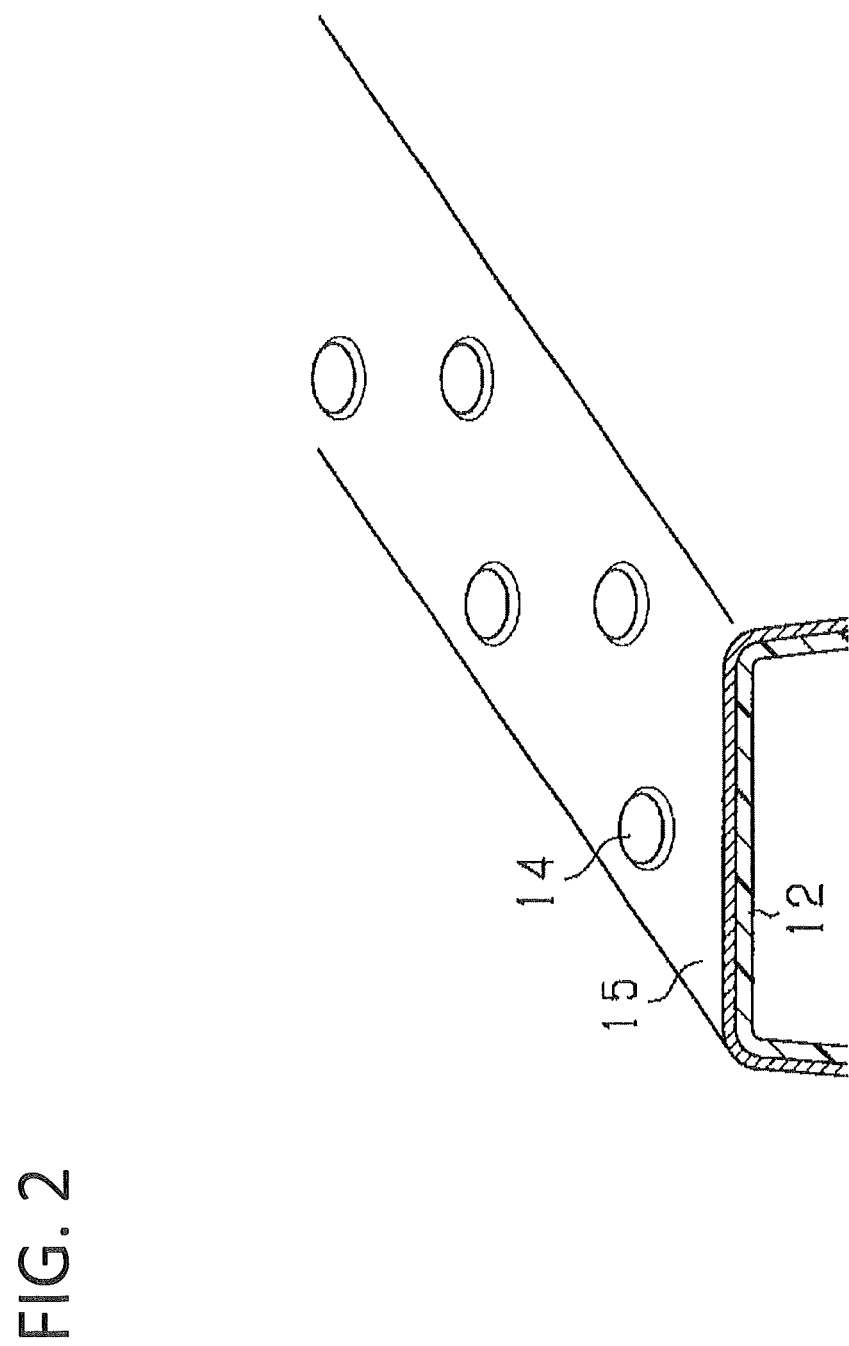
FIG. 2 is a perspective view viewed in a direction of an arrow B in FIG. 1(b).
Figure 3:
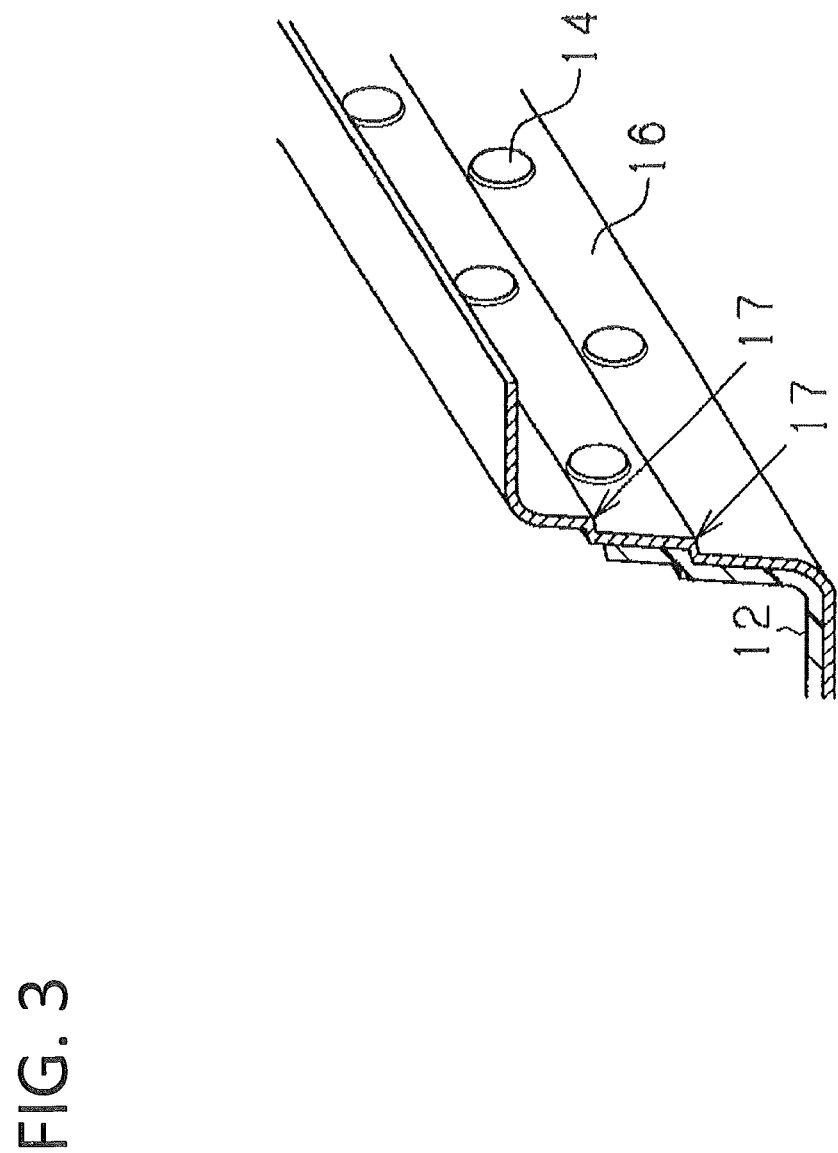
FIG. 3 is a schematic perspective view viewed in a direction of an arrow C in FIG. 1(b).

Here, "a bottom part" of the as shown in FIG. 1(*b*) is referred to as "a bottom surface part 15", and a slope-like part adjacent to the bottom surface 15" is referred to as "a side surface part 16". As shown in FIGS. 2 and 3, bonding parts between the reinforcing member 12 and the patch members 14 (i.e., the openings 13 as shown in FIG. 1(*b*)) are arranged in the longitudinal direction of the composite structure 10 so as to represent a staggered arrangement on the bottom surface part 15 and the side surface parts 16. In addition, a plurality of step difference profiles 17 are formed on the side surface parts 16, as shown in FIG. 3. On the side surface parts 16, the bonding parts between the reinforcing member 12 and the patch members 14 are arrayed along the step difference profiles 17.

<Dies Construction>

Figure 4:
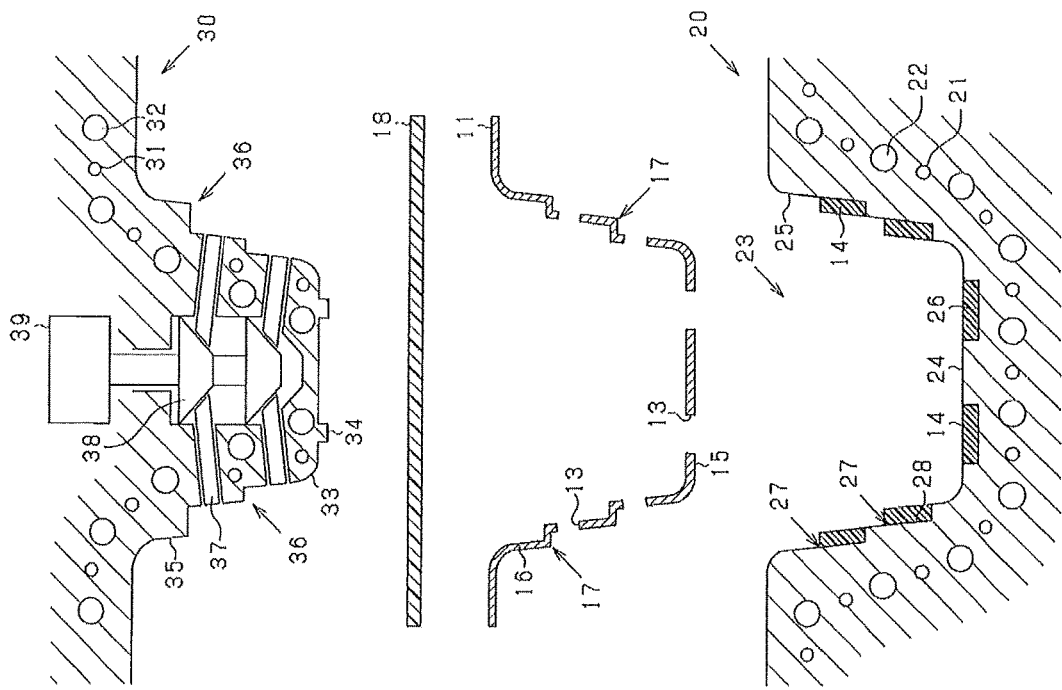
FIG. 4 is a schematic view illustrating a first manufacturing method according to the one example.

Next, a dies construction used in a manufacturing method of the composite structure 10 having the configuration herein-above mentioned will be explained with referring to FIG. 4. It is noted that a prepreg 18 as shown in FIG. 4 is made of a CFRP sheet and used for constituting the reinforcing member 12.

In a female (outer) die 20, which is a stationary die, heaters 21 and coolers 22 are imbedded. The heaters 21 and coolers 22 are arranged along an inner surface of an outer die forming part 23, i.e., a hat shaped space in a cross-sectional view, the space forming a molding cavity, and the heaters 21 and coolers 22 are provided to heat or cool the outer die 20 as desired, according to a process situation. The outer die forming part 23 is a space surrounded by an outer die bottom surface 24 corresponding to the bottom surface part 15, and outer die side surfaces 25 corresponding to the side surface parts 16, respectively, the space being open toward an upper direction in FIG. 4.

The outer die bottom surface 24 is provided substantially orthogonal to a direction for removing the composite structure after molding, wherein the direction is equivalent to the upper direction in FIG. 4, and hereinafter referred to as "a removal direction". The outer die bottom surface 24 has bottom surface recesses 26 for receiving (setting) the patch members 14. The bottom surface recesses 26 are opened toward the above removal direction.

The outer die side surfaces 25 of the outer die are provided to extend along the removal direction. On the outer die side surfaces 25, particularly, at positions corresponding to the step difference profiles 17 of the main body 11, a plurality of counter step difference profiles 27 are provided, respectively. The counter step difference profiles 27 are step difference parts corresponding to the above step difference profiles 17. On the other hand, on the outer die side surfaces 25, particularly, at positions for receiving (be setting) the patch members 14, side surface recesses 28 are provided for receiving the patch members 14. The side surface recesses 28 are a U-shaped channel extending from the counter step difference profiles 27 to the outer die bottom surface 24 (on a bottom side in the figure), and have step difference profiles which are opened toward the removal direction shown in the cross-sectional view of FIG. 4.

A male (inner) die 30, which is a moving die, is removaly located above the outer die 20 (a moving direction is equivalent to "a relative movement direction" of the present disclosure: the movement direction being parallel to "the removal direction" as hereinabove mentioned.). The inner die 30 also has the heater 31 and the cooler 32 imbedded therein, likewise as the outer die 20

The inner die 30 has an inner die forming part 33 having a projection part corresponding to the outer die forming part 23. On the inner die forming part 33, particularly, at positions corresponding to the bottom surface recesses 26 when closing the dies, bottom convexes 34 are provided. Each of the bottom convexes 34 is an approximate cylindrical member having a smaller diameter than an opening diameter of the opening 13. On the other hand, a plurality of counter step difference profiles 36 are provided on the inner die side surfaces 35 corresponding to the outer die side surfaces 25 when closing the dies. The counter step difference profiles 36 are step difference parts corresponding to the step difference profiles 17 hereinabove mentioned, and disposed at positions corresponding to the counter step difference profiles 27 of the outer die 20 when closing the dies. In other words, each of the counter step difference profiles 36 is formed in such a manner that the step differences 17 are accommodated in a space defined between the counter step differences 27 of the outer die 20 and the counter step difference profiles 36 of the inner die 30 when closing.

In addition, the inner die 30 has plungers 37, cams 38, and cylinder 39. The plungers 37 having cylindrical members with a smaller diameter than the opening diameters of the openings 13 are provided at positions corresponding to the openings 13 when closing of the dies. Tip ends of the plungers 38 move back and force, i.e., retract and project, following movement of the cams 38 or the cylinder 39 driving the cams 38.

As hereinabove mentioned, the outer and inner dies 20,30 are configured in such a manner that the prepreg 18, the main body 11, and the patch members 14 are set between those dies 20,30; and subsequently those dies 20,30 are closed; thereby molding the composite structure 10 in the predetermined shape hereinabove mentioned, while forming (molding) the prepreg 18 into the shape of the reinforcing member 12 hereinabove mentioned.

<Manufacturing Method 1>

Hereinafter, a manufacturing method of the composite structure 10 as shown in FIGS. 1-3 using the outer and inner dies 20,30 as shown in FIG. 4 will be explained. The heaters 21 and coolers 22 arranged in the outer die 20, and the heaters 31 and coolers 32 are properly controlled depending on whether the matrix resins contained in the patch members 14 and the prepreg 18 are thermoplastic resin or thermosetting resin. However, those elements are not the subject matter of the present disclosure, and within well-known art, therefore, explanation as to operation of those elements is omitted in order to simplify the description.

First, the outer and inner dies 20,30 are prepared as shown in FIG. 4. The main body 11 having the openings 13 as hereinabove mentioned is prepared. Furthermore, the patch members 14 are set in the bottom surface recesses 26 and the side surface recesses 28 of the outer die 20. The prepreg 18 and the main body 11 are set between the outer and inner dies 20,30 so as to be interposed between the prepreg 18 and the patch members 14.

Figure 5:
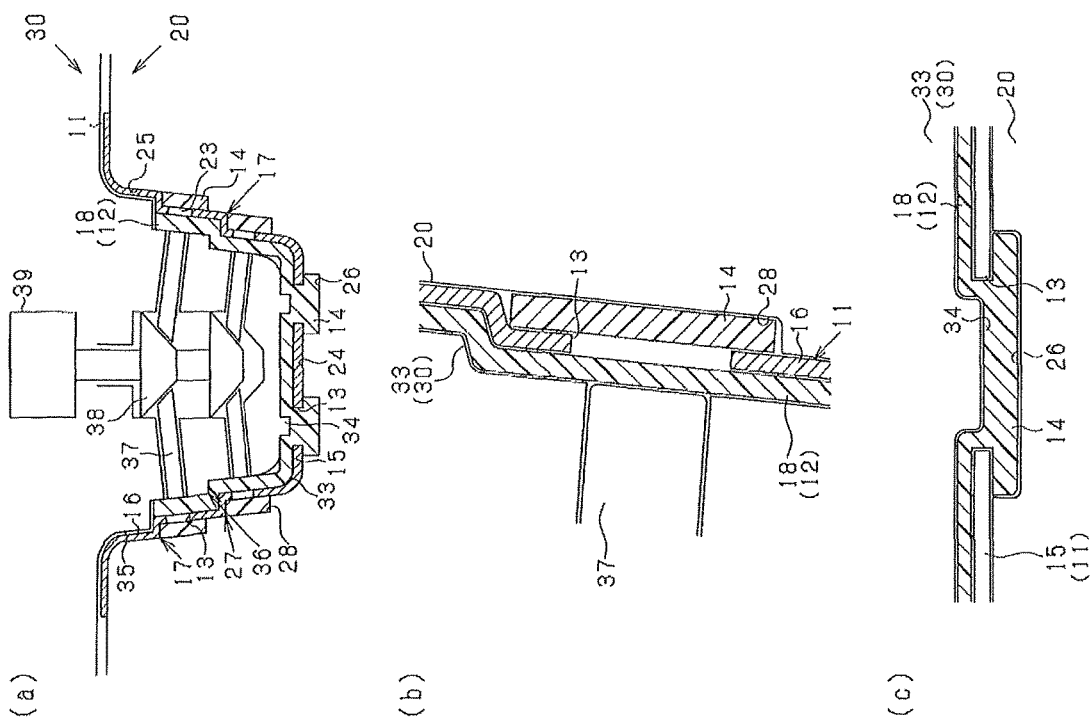
FIG. 5 is a schematic view illustrating the first manufacturing method according to the one example.

Next, the outer and inner dies 20,30 are closed, as shown in FIG. 5. Thereby, the prepreg 18 is molded into the hat shape as hereinabove mentioned, i.e., the reinforcing member 12 is formed of the molded prepreg. It is noted that, at this time, the plungers 37 have not yet been projected, therefore, the prepreg 18 (the reinforcing member 12) is not bonded to the patch members 14 on sides of the side surface parts 16. On the other hand, on the bottom surface part 15, the bottom convexes 34 selectively apply bonding pressures onto insides of the openings 13 via the prepreg 18, respectively, when closing of the dies as shown (c) of FIG. 5. In other words, on a laminater made or the prepreg 18, the main body, and the patch members 14, the bonding pressures are selectively applied at positions (sections) corresponding to the insides of the openings 13. Thus, the prepreg 18 (reinforcing member 12) and the patch members 14 are bonded with each other through the openings 13.

Figure 6:
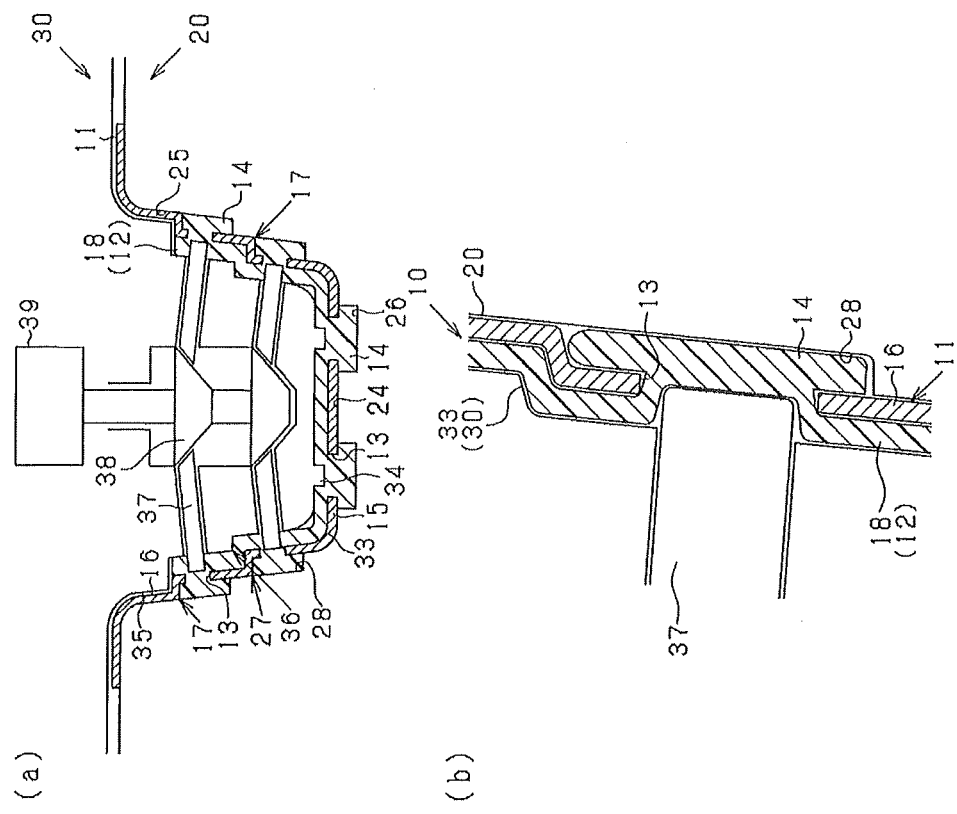
FIG. 6 is a schematic view illustrating the first manufacturing method according to the one example.

Subsequently, the plungers 37 project in the closing state, as shown in FIG. 6. On the side surface parts 16, the projecting plungers 37 selectively apply the bonding pressures onto the sections of the above laminater corresponding to the insides of the openings 13, respectively. Thus, the prepreg 18 (reinforcing member 12) and the patch member 14 are coupled. Thereby, the reinforcing member 12, the main body, and the patch members 14 are bonded each other to form the composite structure 10.

Figure 7:
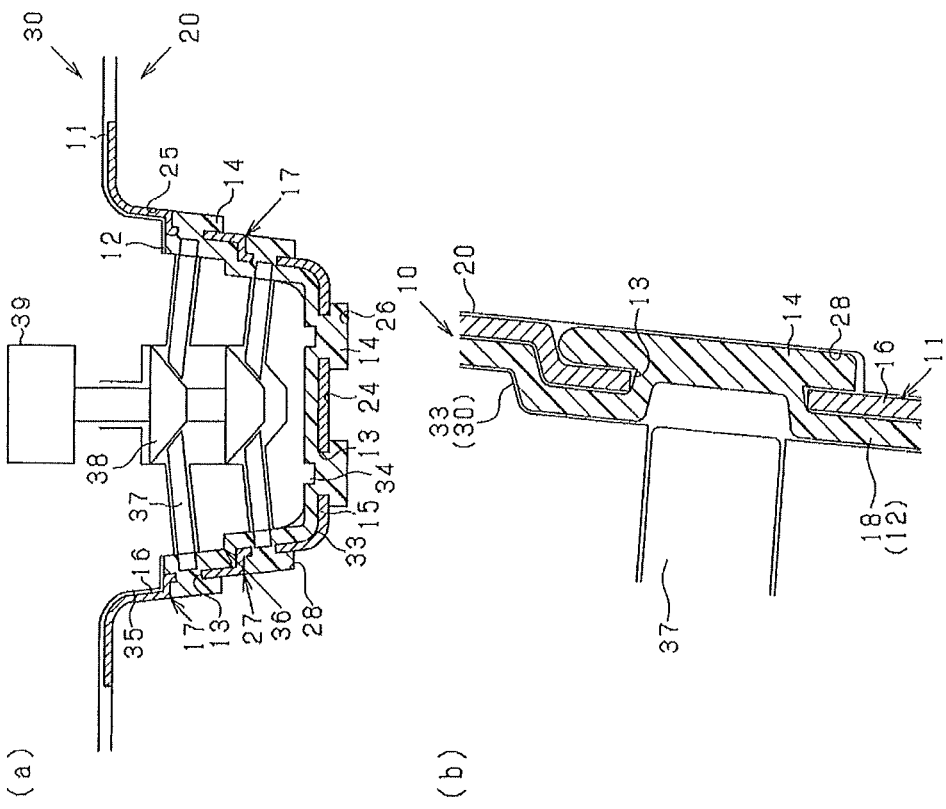
FIG. 7 is a schematic view illustrating the first manufacturing method according to the one example.

Thereafter, the plungers 37 retract in the closing state, as shown in FIG. 7. Finally, the outer and inner dies 20, 30 are opened, and the molded composite structure 10 is removed, as shown in FIG. 8.

Figure 8:
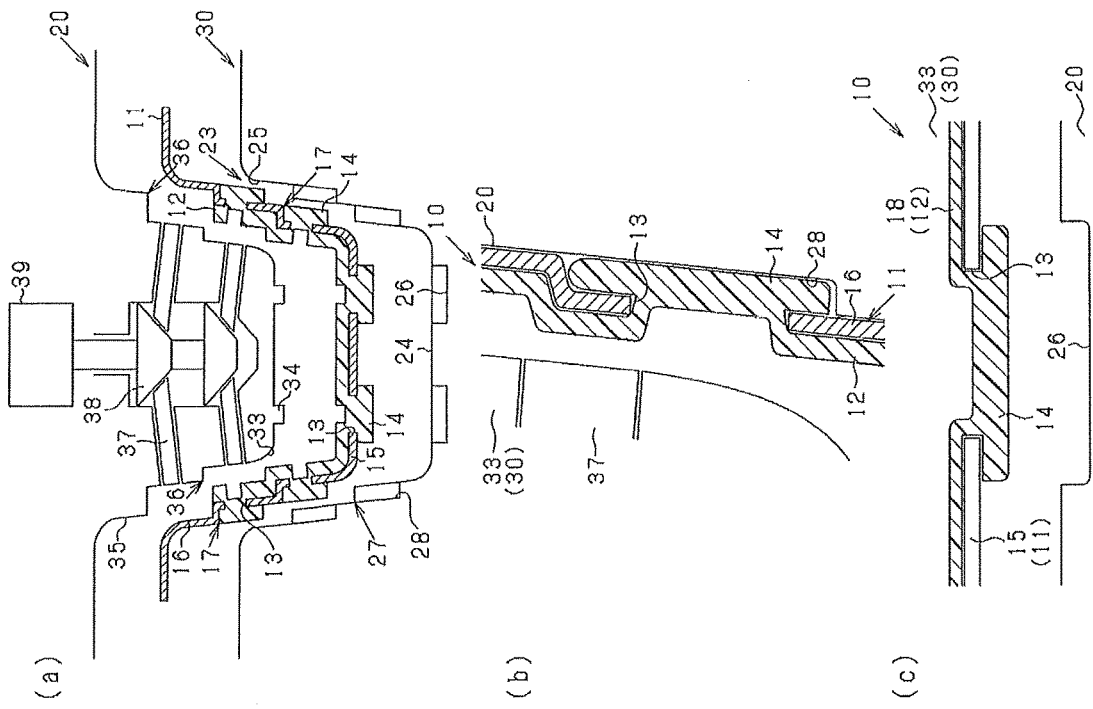
FIG. 8 is a schematic view illustrating the first manufacturing method according to the one example.

As shown in (a) and (c) of FIG. 8, the bottom surface recesses 26 are defined by the recesses opened toward the removal direction, respectively. As shown in (a) and (b) of FIG. 8, the side surface recesses 28 are defined by the step differences formed on the side surfaces 25 of the outer die 20, the side surfaces 25 being included on the inner surface of the outer die 20 and extending in the removal direction, respectively. In summary, both the bottom surface recesses 26 and the side surface recesses 28 are open toward the removal direction. Therefore, it is easy to set the patch members 14 and to remove the molded composite structure 10.

As explained above, according to the manufacturing method according to the one exemplary embodiment, the molding the prepreg 18 into the reinforcing member 12, and the bonding the reinforcing member 12 to the main body 11 are simultaneously and easily performed through one molding cycle of the closing-opening of the outer and inner dies 20,30. In addition, the reinforcing member 12 and the patch members 14 are bonded each other through the openings 13. In particular, each of the patch members 14 is formed to have the larger size (diameter) than the opening 13. Therefore, eave structures made of outer edges of the patch members 14 provide hooking parts for preventing delaminate between the main body 11 and the reinforcing member 12, respectively. Thus, according to the one exemplary embodiment, the bonding between the main body 11 and the reinforcing member 12 is performed without using an adhesive. Therefore, the bonding between the main body 11 and the reinforcing member 12 is performed at a lower cost and with a satisfactory boding strength.

<Modifications>

Several representative modifications will next be exemplified. In the following description of the modifications, component members similar in structure and function to those of the hereinabove-described exemplary embodiment are denoted by names and reference numerals similar to those of the hereinabove-described exemplary embodiment. The description of the component members appearing in the hereinabove description of the embodiment can be applied as appropriate, so long as no technical inconsistencies are included. Needless to say, even modifications are not limited to those described below. The constitution of the hereinabove-described exemplary embodiment and the constitutions of the modifications to be described below are entirely or partially applicable in appropriate combination, so long as no technical inconsistencies are included.

The present invention is not limited to the specific configurations of the exemplary embodiment described hereinabove. For example, the patch member 14 may be made of the same continuous fiber reinforced plastic CFRP as the reinforcing member 12. Alternatively, the patch member 14 may be only made of synthetic resin which is the same as the matrix resin contained the reinforcing member 14 or similar resin as the matrix resin (those resin may have no reinforcing fiber). In addition, the shape of the patch member 14 is not limited to an approximate round shape, but may be an approximate polygonal shape or elliptic shape. Alternatively, the neighboring patch members 14 may be integrated each other by connecting those members 14 with a rod member.

In the exemplary embodiment described hereinabove, "selective" bonding pressure is applied on the corresponding section located inside or inwardly of the opening 13, thereby the prepreg 18 (reinforcing member 12) is more firmly bonded to the patch member 14, as compared with the case that "uniformly" bonding pressure is applied between the main body member 11 and the prepreg 18 irrespective of the presence of the opening(s). It is not needed that each of the bottom convexes 34 or plunger 37 has a smaller diameter as a whole than the opening diameter of the opening 13. In other words, it is enough that each of the bottom convexes 34 or plungers 37 has at least tip end having a smaller diameter than the opening diameter of the opening part 13.

In order to securely set the patch members 14 in the side surface recesses 28, the patch members 14 may be drawn by negative pressures through passages, the passages being formed to open on (in) the side surface recesses 28. In order to prevent falling-off of the patch members 14, on lower ends of the side surface recesses 28, pawls are provided to restrain the patch members 14 in a manner that the pawls do not prevent the removal of the composite structure 10 after molded, respectively. The plungers 37 may be a hydraulic type device. Prior to setting the patch members 14, the main body 11 and the prepreg 18 may be set between the outer and inner dies 20,30.

Applicable object of the present disclosure is not limited to a center pillar member for a vehicle. It is noted that the present disclosure is very preferably applied to a vehicle body component, in particular, a component made of a bonding structure of the high tension steel (such as a product manufactured by die-quench method) with the fiber reinforced plastic. The shape and configuration of the composite structure 10 is not specially limited. Instead of the plungers 37, a convex(es) equivalent to the bottom convex(es) 34 may be used, depending on the shape of the composite structure 10. The pressure applying members, such as the plungers 37, etc., may be provided on the outer die 20 or both the outer and inner dies 20,30, (depending on a shape of the composite structure 10).

The fiber reinforced plastic sheet available according to the present disclosure is not limited to a continuous fiber (long filament) FRP sheet. Therefore, the present disclosure is preferably applied to a short fiber (filament) FRP sheet. It is noted that the present disclosure is particularly preferably applied to the mode that the continuous fiber reinforced plastic sheet and the metallic sheet are bonded each other. The reinforcing member 12 and the patch members 14 may be made of the same material or different materials. The present disclosure may be preferably applied to a structure including an adhesive layer interposed between the main body 10 and the reinforcing member 12. The metallic sheet used in the present disclosure is not limited to a steel sheet.

<Manufacturing Method 2>

Figure 9:
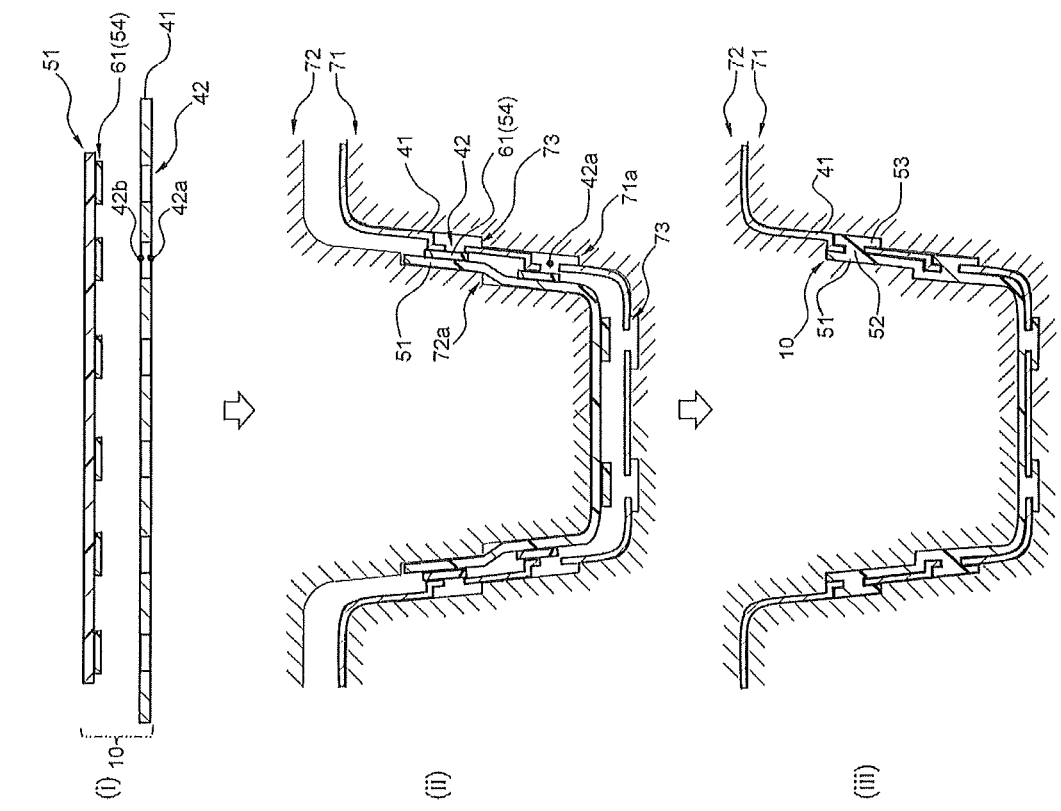
FIG. 9 is a schematic view illustrating a second manufacturing method according to the one example.

Referring to FIG. 9, Manufacturing Method 2 will be explained as one exemplary embodiment. In explaining Manufacturing Method 2, as to the common features between Manufacturing Methods 1 and 2, the explanation of Manufacturing Method 1 can be suitably referred to.

The Manufacturing Method 2 has processes as follows:

[(a) Process, See (i) Process of FIG. 9, See (ii) Process of FIG. 9 as to Dies 71,72]

A metallic sheet 42 having a plurality of through-holes 42 penetrating throughout the metallic sheet 42 in a thickness direction of the metallic sheet is prepared. The plurality of the through-holes 42 are distributedly formed in the metallic sheet 42, depending on a desired bonding strength or impact resistance.

A prepreg 51 is prepared in order to constitute a fiber reinforced plastic sheet. On one surface of the prepreg 51, patch members 61 are positioned opposed to the through-holes 42, thereby forming thickening parts 54. In other words, locally increasing a stack number of prepreg 51-constituting-materials forms the thickening parts 54. Therefore, on the prepreg 51, the thickened parts can be protruded from the through-holes 42, respectively.

A pair of dies (71,72) for molding a composite structure in a predetermined shape are prepared. The pair of dies (71,72) can have recesses 73 opposed to one side openings 42a of the through-holes 42, respectively. The one side openings 42a are positioned on a side of the outer die 71 for holding the metallic sheet 41. On at least a boundary surface between the recesses 73 and the openings 42a, each of the recesses 73 has a larger diameter than the one side opening 42a.

The recesses 73 arranged on the sides of the dies (71,72) are defined by step difference profiles 71a,72a of the outer and inner dies 71,72, and the metallic sheet 41 held between the step difference profiles 71a,72a. On a bottom side of the dies (71,72), the recesses 73 are formed on the outer dies 71.

[(b) Process, See (ii) Process of FIG. 9]

The prepreg 51 and the metallic sheet 41 are set in/on the pair of dies (71,72) in a manner that the patch members 61 (the thickness parts 54) oppose to the through-holes 42, respectively. The metallic sheet 41 is hold on the outer die 71, whereas the prepreg sheet 51 is hold on the inner die 72

[(c) Process, See from (ii) Process to (iii) Process of FIG. 9]

The dies (71,72) are closed. In detail, the inner die 71 is pressed toward the outer die 72, so that the prepreg 51 and the metallic sheet 41 are surface-contacted or bonded each other, thereby integratedly molding the prepreg 51 and the metallic sheet 41 into a predetermined shape. Simultaneously, the patch members 61 (the thickening parts 54) are pressed to be extruded into the through-holes 42, and finally protrude in the recesses 73 via the one side openings 42a, respectively. In such a way, shaft pars 52 and head (engaging or eave) parts 53, which are made of a fiber reinforced plastic, are formed to be integrated with the prepreg (sheet part or main body) 51. Each of the head parts 53 has a larger diameter than an opening diameter of the opening 42a, thereby engaging on one surface of the metallic sheet 41. Each of the head parts 53 has a profile formed following the shape of the outer die 71.

The pair of dies (71,72) are opened (released from one another) to produce a composite structure, and the produced composite structure has chemical (engaging) bonding between one surfaces of the metallic sheet 41 and the prepreg 51 each other, and mechanical bonding using the shaft parts 52 and the head parts 53. Referring FIG. 1(a), FIG. 1(b), FIG. 5(c), FIG. 6(b), FIG. 7(b) or FIG. 8(b), and FIG. 8(c), it can be found that the composite structure 10 according to the Manufacturing Method 2 has the same product (structure) and properties as that according to Manufacturing Method 1.

As above-mentioned in Manufacturing Method 1, the dies (71,72) may be provided with heaters or coolers in order to plastically deform the prepreg 51 or the patch members 61, and/or to perform heating or cooling treatment for curing them, depending on characteristics of the prepreg 51 or the patch members 61.

Referring to (i) process of FIG. 9, in Manufacturing Method 2, the patch members 61 (the thickening parts 54) are set on a side of the other side opening 42b of the through-hole 42, i.e., on a side of the prepreg 51. In Manufacturing Method 1, the patch members 61 are set on a side of the one side opening 42a of the through-hole 42, i.e., on a side of the metallic sheet 41 or the outer die 71. In Manufacturing Method 3 herein-below mentioned, patch members are set on both sides of the through-holes 42, respectively.

<Manufacturing Method 3>

Figure 10:
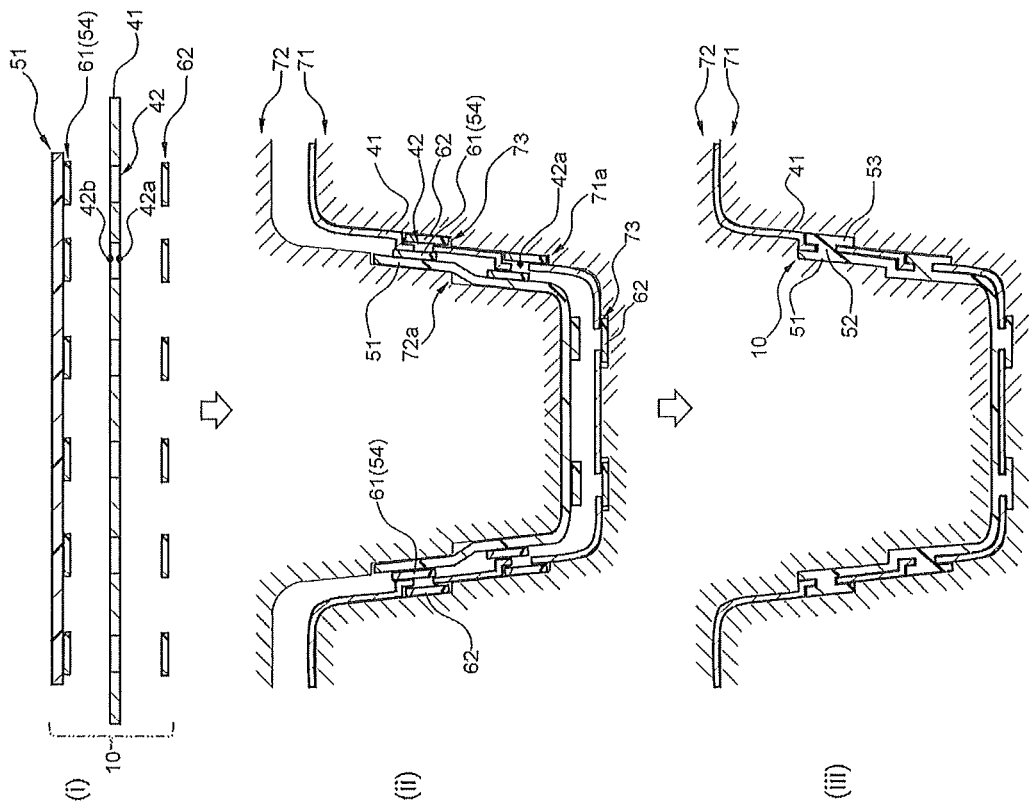
FIG. 10 is a schematic view illustrating a third manufacturing method according to the one example.

Referring to FIG. 10, Manufacturing Method 3 will be explained as one exemplary embodiment. In explaining Manufacturing Method 3, as to the common features between Manufacturing Methods 2 and 3, the explanation of Manufacturing Method 2 can be suitably referred to, whereas different features between those Methods 2 and 3 will be principally explained. The Manufacturing Method 3 has processes as follows:

[(a) Process, See (i) Process of FIG. 10, See (ii) Process of FIG. 10 as to Dies 71,72]

As the prepreg member, first patch members 61 (the thickening parts 54) are set on the prepreg 51, and a second members 62 are in the recesses 73. The recesses 73 are defined by step difference profiles 71a,72a of the outer and inner dies 71,72, and the metallic sheet 41 held between both step difference profiles 71a,72a. The recesses 73 arranged on a bottom side of the dies (71,72) are formed on the outer die 71.

[(b) Process, See (ii) Process of FIG. 10]

The prepreg 51, the metallic sheet 41, and the second patch members 62 are set in the the dies (71,72) in a manner that the second patch members 62 oppose to the first patch members 61 via the through-holes 42, respectively.

[(c) Process, See from (ii) Process to (iii) Process of FIG. 10]

The dies (71,72) are closed. In detail, the inner die 71 is pressed toward the outer die 72, so that the prepreg 51 and the metallic sheet 41 are surface-contacted or bonded each other, thereby integratedly molding the prepreg 51 and the metallic sheet 41 into a predetermined shape. Simultaneously, the first patch members 61 (the thickening parts 54) are pressed between the step difference profiles 71a,72a to be extruded into the through-holes 42, and are finally bonded to the second patch members 62, respectively. The pair of dies (71,72) are opened to produce a composite structure 10 having the same structure as those manufactured by Manufacturing Method 1 or 2.

In Manufacturing Methods 1 to 3, another patch members may be received in or fit onto the metallic sheet 41 (main body 11), in particular, the through-holes 42 (openings 13) disposed in the metallic sheet 41, respectively. In Manufacturing Methods 1 to 3, around an edge(s) of the through-hole(s) 42 (or opening(s)), a counterbore(s) may be formed. The counterbore(s) may be utilized for retaining a different patch member(s) before bonding, and/or utilized as a fit part(s) onto which the (plastic) head part 53 fit(s) after bonding.

The entire disclosures of the hereinabove Patent Literature are incorporated herein by reference thereto. Modifications and adjustments of the exemplary embodiment(s) are possible within the scope of the overall disclosure (including the claims) of the present disclosure and based on the basic technical concept of the present disclosure. Various combinations and selections of various disclosed elements (including each element of each claim, each element of each exemplary embodiment, each element of each drawing, etc.) are possible within the scope of the present disclosure. That is, the present disclosure of course includes various variations and modifications that could be made by those skilled in the art according to the overall disclosure including the claims and the technical concept. Particularly, any numerical range disclosed herein should be interpreted that any intermediate values or subranges falling within the disclosed range(s) are also concretely disclosed even without explicit recital thereof.

The present application claims priority based on JP Patent Application No. 2013-050924, (which is filed in Japan on Mar. 13, 2013, and hereinafter is so-called "the earlier application". A critical date of entire disclosure of the earlier application is a filing date (a priority date), as far as the earlier application, which is not affected by any incorporated or changed portions in the present application being later application at all. It is noted that, in the present application, a critical date of the entire disclosure including the incorporated or changed portions is an international filing date of the present application.

REFERENCE SIGNS LIST

10 Composite (Hybrid) Structure
11 Base body (Base Part)
12 Reinforcing member
13 Opening
14 Patch Member
18 Prepreg
20 Outer Mold
26 Bottom surface Recess
27 Step Difference Profile
28 Side Surface Recess
30 Inner Mold
34 Bottom Convex
36 Step Difference Profile
37 Plunger
41 Metallic Sheet
42 Through-hole
42a One Side Opening (Outer Opening)
42b Other Side Opening (Inner Opening)
51 Prepreg (Prepreg Main Body, Plate Part, Prepreg sheet part)
52 Shaft Part (Bridge Part)
53 Head Part (Engaging Part, Eave Part)
54 Thickening part (Patch member, First Patch Member)
61 Patch member, First Patch Member
62 Second Patch Member
71,72 Pair of Dies
71 Outer Mold (Lower Mold, Female Mold)
71a Step difference Profile
72 Inner Mold (Upper Mold, Male Mold)
72a Step difference Profile
73 Convex

The invention claimed is:

1. A method of manufacturing a composite structure formed of a fiber reinforced plastic sheet and a metallic sheet, comprising:
preparing a pair of dies for molding a composite structure of a predetermined shape;
preparing a metallic sheet(s) having at least one opening defined by a through-hole(s) penetrating the metallic sheet(s) in a thickness direction of the metallic sheet(s);
setting a patch member(s) on one of the pair of dies, the patch member(s) made of plastic and having a larger size than the opening(s);

setting a prepreg(s) to constitute a fiber reinforced plastic sheet(s) and the metallic sheet(s) in the pair of dies in a manner that the metallic sheet(s) is interposed between the prepreg(s) and the patch member(s); and closing the pair of dies, and simultaneously, selectively applying pressure on a corresponding portion(s) located inwardly of the at least one opening so as to joint-bond the prepreg(s), the metallic sheet and the patch member(s) to each other by bonding the prepreg(s) to the patch member(s) through the at least one opening, thereby producing the composite structure molded in the predetermined shape; wherein the one die of the pair of dies has a recess(es) receiving the patch member(s), the recess(es) open toward a removal direction of the composite structure after molded, a shaft part(s) is molded in the through-hole(s) so that the shaft part(s) is integrated with the prepreg, and a head or engaging part(s) is molded in the recess(es) so that the head or engaging part(s) is integrated with the shaft part(s) and has a larger diameter(s) than the opening(s).

2. The manufacturing method of the composite structure according to claim 1, wherein the pair of dies have a step difference profile(s) arranged on the inner surface extending in a relative movement direction of the pair of dies, and wherein the recess(es) is defined by the step difference profile(s).

3. The manufacturing method of the composite structure according to claim 1, wherein the fiber reinforced plastic sheet(s) is bonded to one side surface(s) of the metallic sheet(s).

4. The manufacturing method of the composite structure according to claim 1, wherein the fiber reinforced plastic sheet(s) contains continuous reinforce fiber.

5. The method of manufacturing a composite structure according to claim 1, further comprising:

as the prepreg(s), preparing a prepreg(s) having a thickening part(s) arranged at a position(s) opposed to the through-hole(s); and extruding the thickening part(s) into the through-hole(s) so as to bond to the patch member(s) set in the pair of dies.

6. A method of manufacturing a composite structure formed of a fiber reinforced plastic sheet and a metallic sheet, comprising:

preparing a pair of dies for molding a composite structure of a predetermined shape;

preparing a metallic sheet(s) having at least one opening defined by a through-hole(s) penetrating the metallic sheet(s) in a thickness direction of the metallic sheet(s);

setting a patch member(s) on a prepreg(s) for constituting a fiber reinforced plastic sheet(s), the patch member(s) made of plastic and having a larger size than the opening(s);

setting the prepreg(s), the patch member(s) and the metallic sheet(s) in the pair of dies in a manner that the patch member(s) is interposed between the prepreg(s) and the opening(s); and closing the pair or dies, and simultaneously, selectively applying pressure on a corresponding portion(s) located inwardly of the at least one opening so as to joint-bond the prepreg(s), the metallic sheet and the patch member(s) to each other by bonding the prepreg(s) to the patch member(s) and protruding the patch member(s) to the opposite side through the opening(s), thereby producing the composite structure molded in the predetermined shape: wherein the one die of the pair of dies has a recess(es) receiving the patch member(s), the recess(es) open toward a removal direction of the composite structure after molded, a shaft part(s) is molded in the through-hole(s) so that the shaft part(s) is integrated with the prepreg, and a head or engaging part(s) is molded in the recess(es) so that the head or engaging part(s) is integrated with the shaft part(s) and has a larger diameter(s) than the opening(s).

7. A method of manufacturing a composite structure formed of a fiber reinforced plastic sheet and a metallic sheet, comprising:

preparing:
a metallic sheet(s) having a through-hole(s) penetrating the metallic sheet(s) in a thickness direction of the metallic sheet(s);

a prepreg(s) in order to constitute a fiber reinforced plastic sheet(s);

a pair of dies for molding a composite structure into a predetermined shape, wherein the pair of dies can have a recess(es) arranged at a position(s) opposed to one side opening(s) of the through-hole(s), the recess(es) having a larger diameter than the one side opening, and a patch member(s) to be set at a position(s) opposed to the through-hole(s);

setting the prepreg(s) and the metallic sheet in the pair of dies; and closing the pair of dies, wherein, upon closing,
the prepreg(s) and the metallic sheet are molded into the predetermined shape, while surface-contacting therebetween, at least one of the prepreg(s) and the patch member(s) is extruded into the through-hole(s), so that the shaft part is molded, and the patch member(s) forms at least part of a head part(s) in the recess(es), the head part(s) being integrated with the shaft part(s) and engaging on the metallic sheet(s).

8. The method of manufacturing a composite structure according to claim 7, wherein the patch member(s) is set in the recess(es), and thereafter, upon closing the pair of dies, the prepreg(s) is extruded into the through-hole(s) to bond to the patch member(s), thereby molding the shaft part(s) and the head part(s).

9. The method of manufacturing a composite structure according to claim 7, wherein the patch member(s) is set on the prepreg(s), and thereafter, upon closing the pair of dies, the patch member(s) is extruded into the through-hole(s), and further into the recess(es), thereby molding the shaft part(s) and the head part(s).

10. The method of manufacturing a composite structure according to claim 7, wherein a first patch member(s) as the patch member(s) is set on the prepreg(s), and a second prepreg(s) as the patch member(s) is set in the recess(es), and thereafter, upon closing the pair of dies, the first patch member(s) is extruded into the through-hole(s) to be bonded to the second patch member(s), thereby molding the shaft part(s) and the head part(s).

* * * * *